May 17, 1938. T. A. MUDD 2,117,566
SLICED BREAD HOLDER
Filed April 13, 1937 2 Sheets-Sheet 1
Fig. 1.
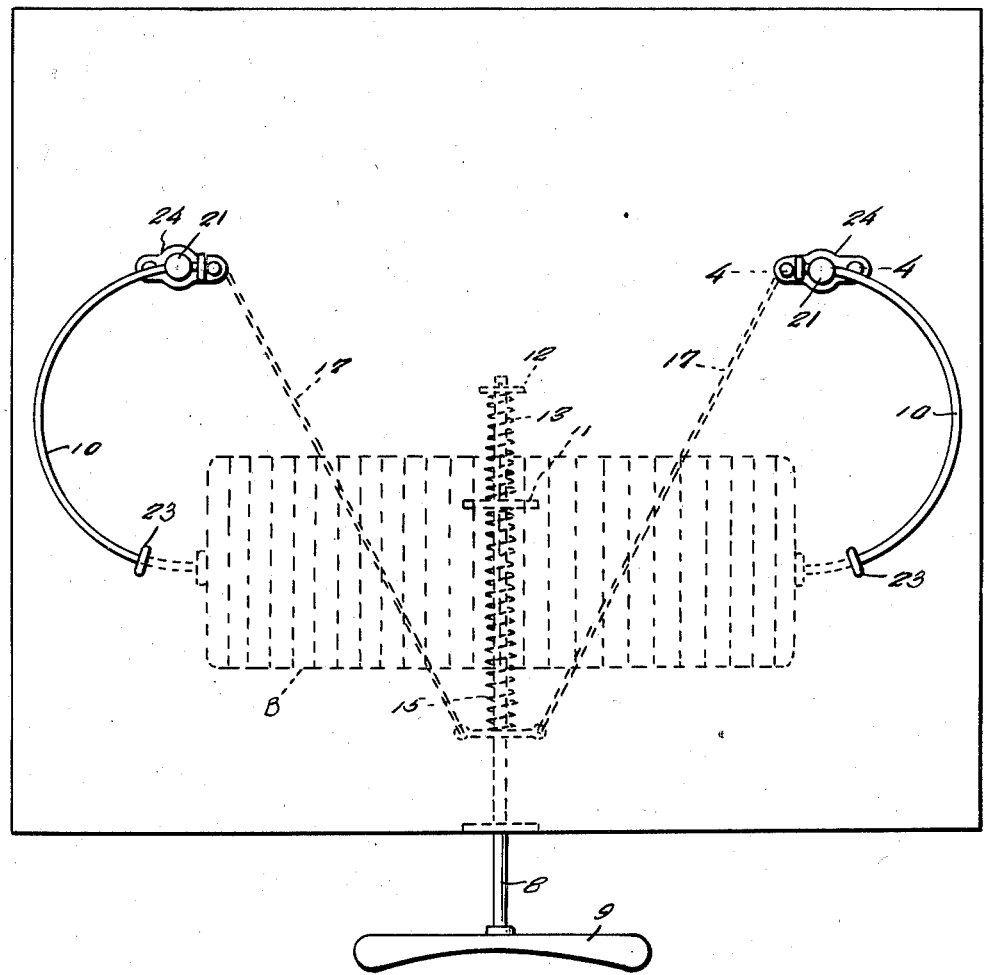
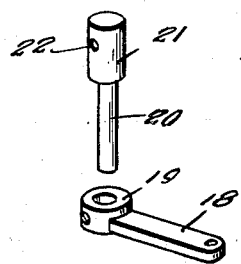
Fig. 5.
Inventor
T. A. Mudd
By Clarence A. O'Brien
Hyman Berman
Attorneys

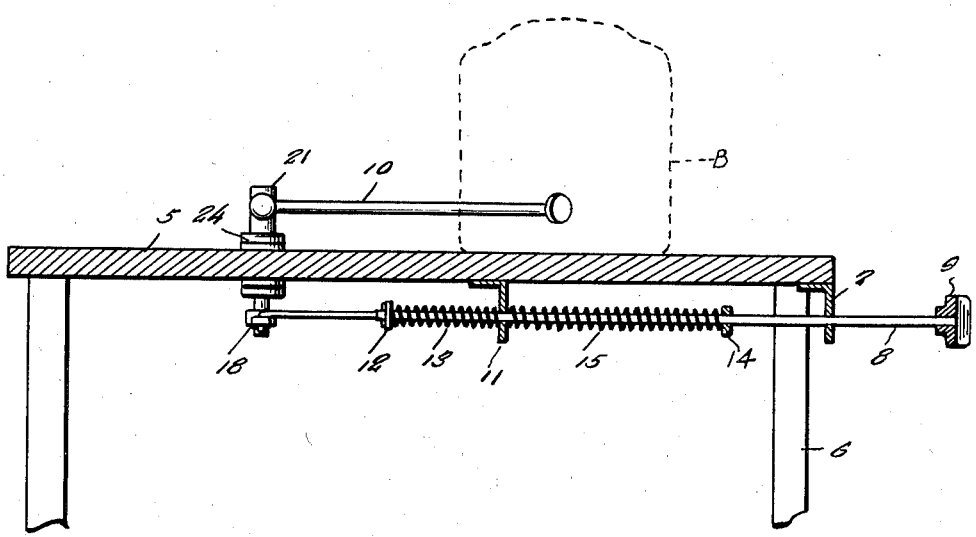
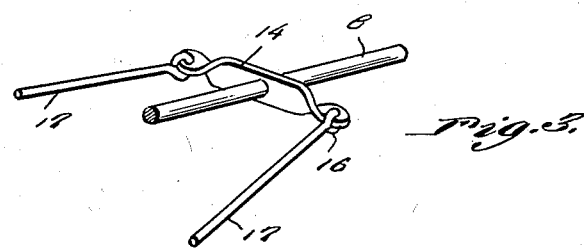
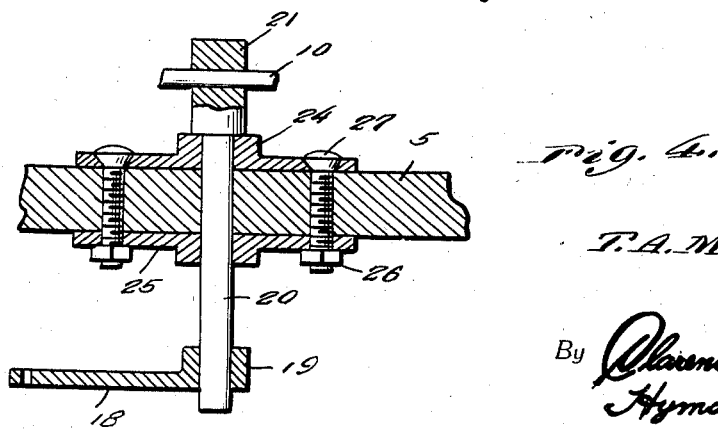

Patented May 17, 1938

2,117,566

UNITED STATES PATENT OFFICE 2,117,566

SLICED BREAD HOLDER

Thomas A. Mudd, Decatur, Ill., assignor of one-half to William Jones, Decatur, Ill.

Application April 13, 1937, Serial No. 136,660

1 Claim. (Cl. 93—2)

This invention appertains to means whereby sliced bread can be held while it is being wrapped.

The principal object of the present invention is to provide an apparatus whereby a loaf of bread after it has been sliced can be held while it is being wrapped, without likelihood of the sliced loaf coming apart.

Another important object of the invention is to provide a device of the character stated which will require the minimum amount of effort to operate the same.

These and various other important objects and advantages of the invention will become apparent to the reader of the following specification.

In the drawings,

Figure 1 represents a top plan view of the apparatus.

Figure 2 is a vertical sectional view.

Figure 3 is a fragmentary perspective view of the operating means.

Figure 4 is an enlarged sectional view taken substantially on the line 4—4 of Figure 1.

Figure 5 is an exploded perspective view of one of the pivot pins and its arm.

Referring to the drawings, wherein like numerals designate like parts, it can be seen that numeral 5 denotes the wrapping board which is supported by legs 6. At the front edge of the board 5 depends the guide plate 7 having an opening therein through which the rod 8 is slidable. The outer end of this rod 8 is provided with a cross member 9 preferably concave on its forward side so that some portion of the operator's body can be conveniently pushed against the same in operating the clamp arm 10—10.

The rod 8 further extends through a guide 11 and has a stop washer 12 on its inner end. Interposed between the washer 12 and the guide 11 is the spring 13, while interposed between the slidable cross member 14 on the rod 8 and the guide 11 is the coiled compressible spring 15.

The cross member 14 has its ends twisted to a right angular plane and apertured to receive the eye ends 16 of the connecting rods 17 which extend to connect to the apertured ends of the arms 18 which project from collars 19 secured by set screws to the reduced shank portions 20 of the pivot pins 21. The upper ends of the pivot pins 21 are provided with openings 22 through which the clamp rods 10 extend. These clamp rods are of arcuate shape and each at its free end is provided with a pressure plate 23 for engaging a corresponding end of a sliced loaf of bread B.

It can accordingly be seen that when the rod 8 is forced inwardly after the sliced loaf B has been set in the position shown in Figure 4, the arm 10 will be swung inwardly so that the pressure plates 23 will engage the ends of the loaf and hold the same while the loaf is being wrapped. Of course, the paper with which the loaf is to be wrapped is primarily set under the sliced loaf.

It is also preferable that the reduced portions 20 of the pivot pins 21 be disposed through bearing plates 24—25 secured to the top and bottom sides of the wrapping board 5 and secured thereto by nuts 26 on bolts 27.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A sliced loaf holder comprising a board adapted to be laid flat upon a table, a pair of laterally spaced pivot pins rotatably mounted in said board to extend vertically therethrough, a pair of clamping arms extending from the upper ends of said pins, respectively, above said board for horizontal swinging movement by said pins from normal position into clamping relation, means for rotating said pins including a crank arm extending from the lower end of each pin under said board, a member slidably mounted on the underside of said board to extend therefrom and operative inwardly from normal position by pressure exerted thereagainst, operating connections between said member and crank arms, spring means tensioning said member against operation from normal position, and shock absorbing means cushioning return movement of said member and arms to normal position and establishing the normal position thereof.

THOMAS A. MUDD.